April 21, 1953 C. P. STOWELL ET AL 2,635,808

COUNTER MECHANISM

Filed Sept. 29, 1950 5 Sheets-Sheet 1

INVENTORS.
CLIFFORD P. STOWELL
BY EDWARD P. DRAKE
HOWARD G. HUMPHREY
ATTORNEY

INVENTORS.
CLIFFORD P. STOWELL
EDWARD P. DRAKE
HOWARD G. HUMPHREY
BY
Fred M. Schwend
ATTORNEY April 21, 1953 C. P. STOWELL ET AL 2,635,808
COUNTER MECHANISM
Filed Sept. 29, 1950 5 Sheets-Sheet 3

INVENTORS.
CLIFFORD P. STOWELL
BY EDWARD P. DRAKE
HOWARD G. HUMPHREY
[signature]
ATTORNEY April 21, 1953 C. P. STOWELL ET AL 2,635,808

COUNTER MECHANISM

Filed Sept. 29, 1950 5 Sheets-Sheet 4

INVENTORS.
CLIFFORD P. STOWELL
BY EDWARD P. DRAKE
HOWARD G. HUMPHREY
[signature]
ATTORNEY

COUNTER MECHANISM

Filed Sept. 29, 1950 5 Sheets-Sheet 5

INVENTORS.
CLIFFORD P. STOWELL
EDWARD P. DRAKE
HOWARD G. HUMPHREY
BY
ATTORNEY

Patented Apr. 21, 1953

2,635,808

UNITED STATES PATENT OFFICE 2,635,808

COUNTER MECHANISM

Clifford P. Stowell, Santa Monica, Edward P. Drake, Glendale, and Howard G. Humphrey, El Monte, Calif., assignors to Clary Multiplier Corporation, San Gabriel, Calif., a corporation of California Application September 29, 1950, Serial No. 187,578

15 Claims. (Cl. 235—79)

This invention relates to calculating machines of the type capable of performing the four cardinal calculations of addition, subtraction, multiplication and division. However, the invention has particular reference to machines of the semiautomatic multiplication and division type.

Calculating machines in general which are capable of performing multiplication and division are usually provided with a register and revolution counting carriage denominationally shiftable with respect to the actuating mechanism therefor in order to enter amounts into proper denominational orders of the register and to register the digits of the multiplier or quotient factors in the proper denominational orders of the register counter. Such machines adequately fulfill their purpose but are relatively expensive, particularly because of the inclusion of a shiftable carriage and controls therefor.

On the other hand, although relatively inexpensive adding-subtracting machines may be used to calculate multiplication and division problems, such machines are handicapped in performance because they do not incorporate means for indicating the multiplier or quotient factors. Non-listing, key responsive machines having directly readable register dials have been used in performing multiplication and even division problems but these machines generally require the services of a highly trained operator and further the operation of such machines tends to be tiring due to the extra physical and mental processes the operator must undergo in order to obtain a result in multiplication and division.

The principal object of the present invention is to eliminate the aforementioned expensive features of a calculating machine of the shiftable carriage type while overcoming the drawbacks found in using a key responsive machine for multiplication and division calculations.

Another object of the invention is to provide a relatively inexpensive calculating machine capable of indicating the multiplier and quotient factors in multiplication and division problems.

Another object is to provide a calculating machine having a single indicator for successively indicating the different digits of a multiplier or quotient factor.

The manner in which the above and other objects of the invention are accomplished will be readily understood upon reference to the following specification when read in conjunction with the accompanying drawings, wherein.

The machine embodying the present invention is based upon the well known, commercially available Clary listing and adding machine disclosed and claimed in general in the copending application of Robert E. Boyden, S. N. 582,553, filed March 13, 1945, and entitled "Calculating Machine," now Patent No. 2,583,810. The accumulator embodied in the machine of the present disclosure is disclosed and claimed in the patent to Edward P. Drake, No. 2,472,696, issued on June 7, 1949. Also, the keyboard is disclosed and claimed in the patent to Robert E. Boyden, No. 2,495,832, issued on January 31, 1950. Accordingly, for the sake of brevity, reference is hereby made to said application and patents for an understanding of details of mechanism not specifically disclosed herein.

*General structure and operation*

Figure 1:
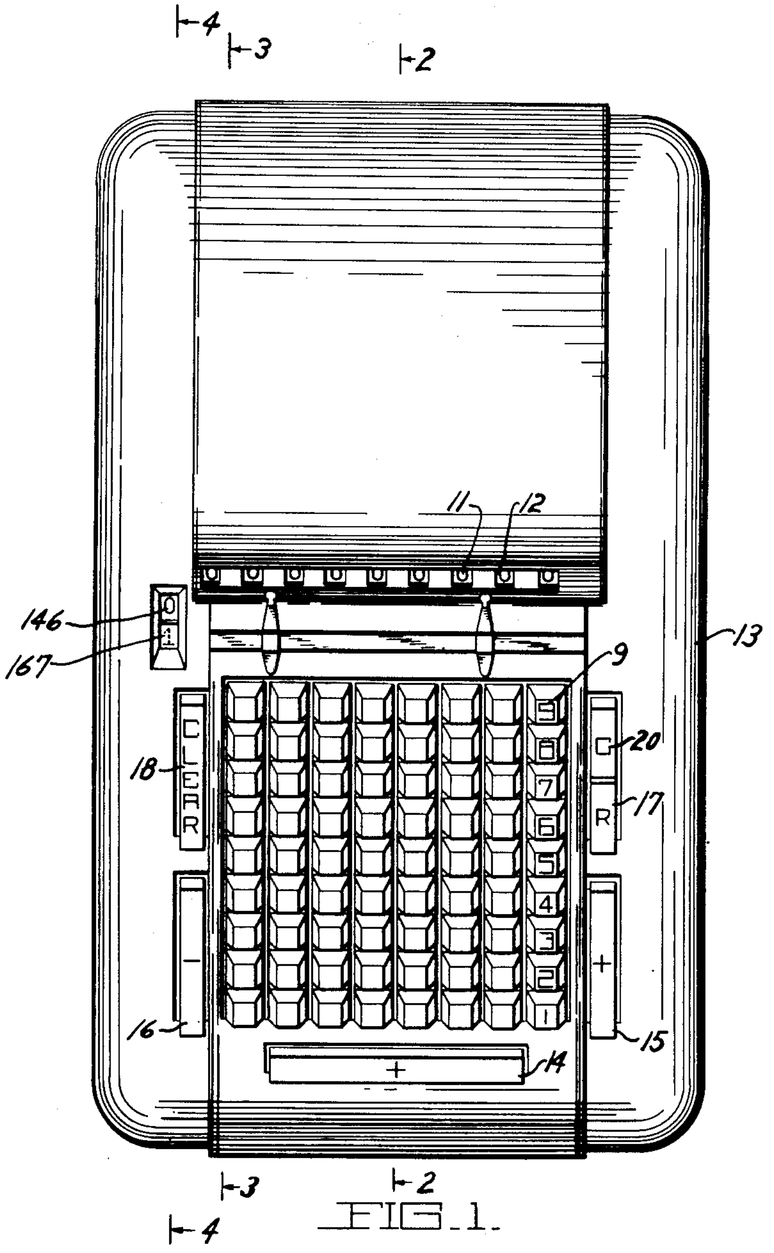
Fig. 1 is a plan view of a machine embodying a preferred form of the invention.

Describing the machine in general, reference is made to Fig. 1 in particular. A series of dials 11, visible through openings 12, are operatively connected to the accumulator so as to indicate at all times the amount registered on the latter. An amount to be added or subtracted is entered into the machine by depressing appropriate amount keys 9. In order to add this amount one or the other of two add bars 14 and 15 is depressed. This amount is then added into the accumulator and the total is visibly indicated by the dials 11. Depressed ones of the amount keys are released following the first cycle of operation of the machine during which either of the add bars 14 or 15 are depressed, unless such amount keys are manually held depressed. When the amount set up on the amount keys is to be subtracted from an amount in the accumulator, a minus bar 16 is depressed. If it is desired to add the same amount in the accumulator two or more times, as is normally done in performing multiplication, a "repeat" bar 17 is depressed and held down until the requisite number of additions are made in the machine. In this case, the depressed ones of the amount keys are not automatically released. In performing division by repetitively subtracting a divisor set up on the keys from a dividend previously entered into the accumulator, the minus bar 16 and repeat key 17 are simultaneously depressed, in which case the machine repetitively subtracts the dividend from the divisor until both keys are released. During this time depressed amount keys are not automatically released.

If it is desired to clear the accumulator and dials 11, a clear bar 18 is depressed, the ensuing operation of the machine also releasing any depressed amount keys. A correction bar 20, when depressed, directly releases any depressed amount keys.

A multiplication-division counter is provided to count the number of cycles of operation of a machine. This counter facilitates the counting of machine cycles during holding of any control bar in depressed position and thus gives a direct indication of each multiplier digit. The counter is associated with division control mechanism which automatically arrests the machine upon an overdraft during division, indicating that the division has been subtracted once too often from the dividend. However, as will appear hereinafter, the counter indicates the true quotient digit irrespective of the excessive cycling of the machine.

Upon each subsequent depression of an add, subtract, or other bar, the counter dial is first automatically returned to zero registration, thus relieving the operator of the necessity of zeroizing the same after an instant multiplication, division, or repeat addition or subtraction problem.

*Keyboard*

The keyboard is of the flexible type, and as disclosed in said Boyden Patent No. 2,495,832, each amount key 9, when depressed, serves as a stop to limit the movement of an aligned drive rack 21 which is capable of entering amounts into the accumulator and clearing the latter.

Each of the keys 9 comprises a key top 22 of plastic material and a key stem 23 guided in aligned slots formed in a top plate 24 and a bottom frame plate 25. The keys in each bank are yieldably pressed upward by a tension spring 26 extending the length of the keyboard and suitably attached at opposite ends to the top plate 24. The spring rests on cross ribs formed across slots 27 formed in the top plate 24 and extends through openings in each of the key stems. Upon depression of a key the adjacent portions of the springs are stretched and extend downwardly through the aforementioned slots.

Means are provided for locking the keys 9 in their depressed positions and for releasing any depressed key. Each key stem has a cam lobe (not shown) formed thereon which when the key is depressed rocks a locking bail 28 pivoted at either end thereof to the front and rear walls of the frame plate 25 by trunnion bearings 29 and 30. At the end of its stroke the cam lobe on the depressed key passes below the bail, enabling the latter to retract partially under the action of a spring (not shown) to a position where it latches the key in depressed position.

A zero stop 31 is formed integrally with each bail 28 and, when no key 9 in any order is depressed, the bail 28 will be spring held in an extreme inward rocked position wherein the zero stop 31 lies directly in front of one of the steps 32 of the associated drive rack 21. However, when any amount key is depressed and latched down, the locking bail 28 will be held outward sufficiently to maintain the zero stop 31 out of the path of the rack 21.

Figure 3:
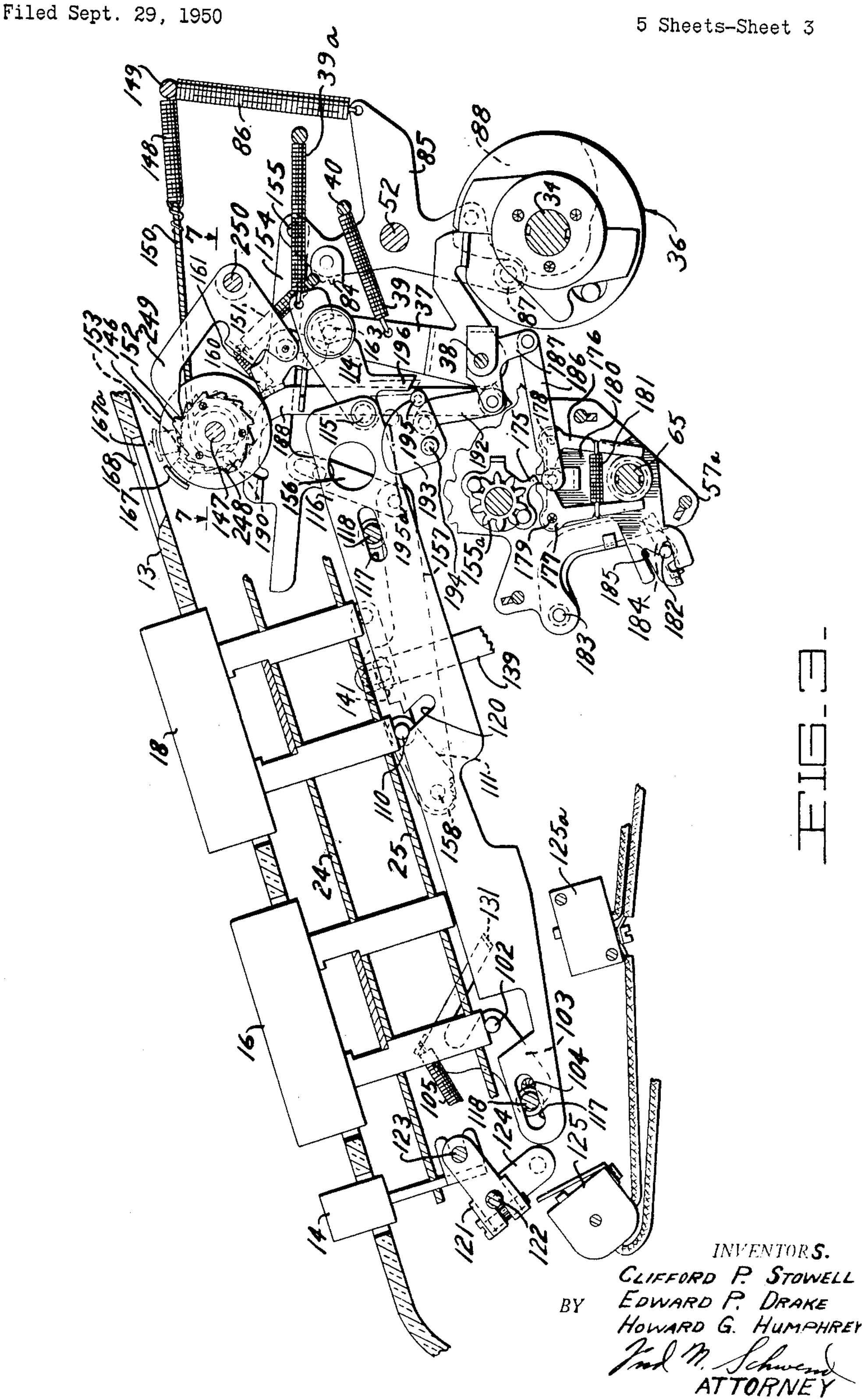
Fig. 3 is a side elevational view illustrating the controls for the main clutch, the overdraft responsive mechanism and the multiplication-division counter. This view is taken substantially along the line 3—3 of Fig. 1.
Figure 4:
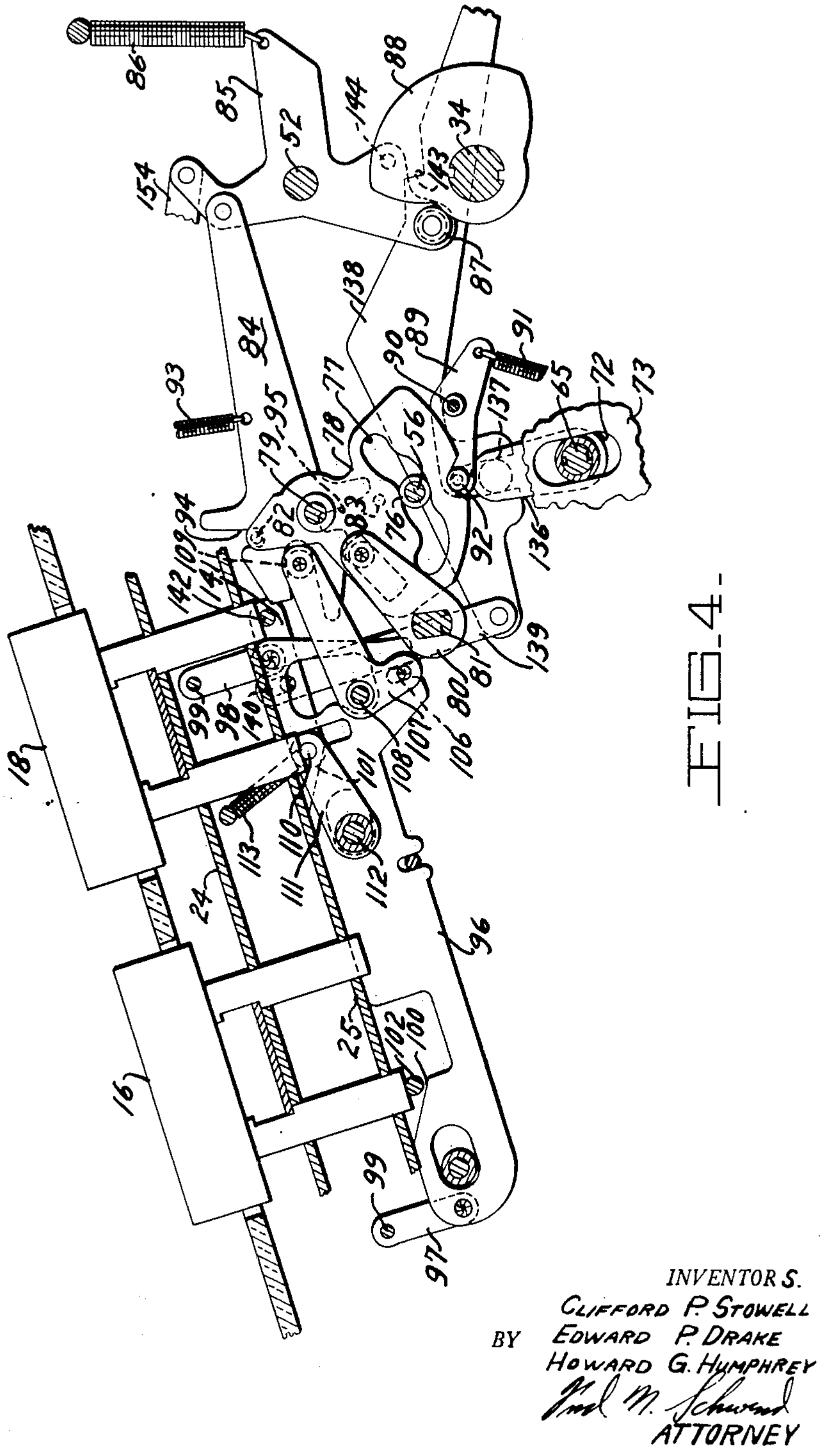
Fig. 4 is a side elevational view illustrating the controls for the accumulator and is taken substantially along the line 4—4 of Fig. 1.

Referring to Figs. 3 and 4, the stems of the control bars 16 and 18 are also guided in slots provided in the top plate 24 and the bottom frame plate 25. The stem of the add bar 14 also extends through aligned slots in the plate 24 and in a bracket 25*a*.

*Drive*

Figure 9:
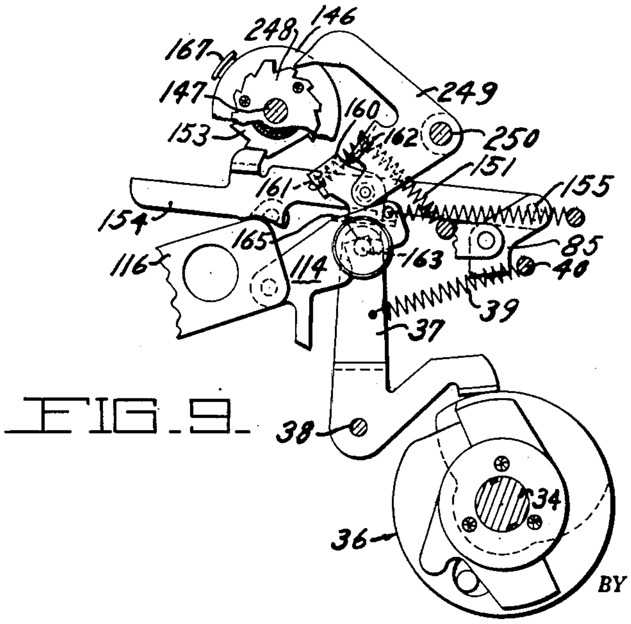
Fig. 9 is a side elevational view of the controls for the multiplication-division counter, showing the condition of the parts when the machine is part way through a cycle of operation.

The machine is provided with a main drive shaft 34 (Figs. 2, 3 and 4) driven by an electric motor schematically illustrated at 35 (Fig.8) through a cyclic clutch generally indicated at 36 (see also Figs. 3 and 9).

The clutch is controlled by a clutch dog 37 pivoted at 38 and normally held in clutch disengaging position by a spring 39 extending between the clutch dog and a frame stud 40. Disengagement of the clutch is effected by rocking the dog 37 counter-clockwise against the action of spring 39 into the position shown in Fig. 9.

Figure 2:
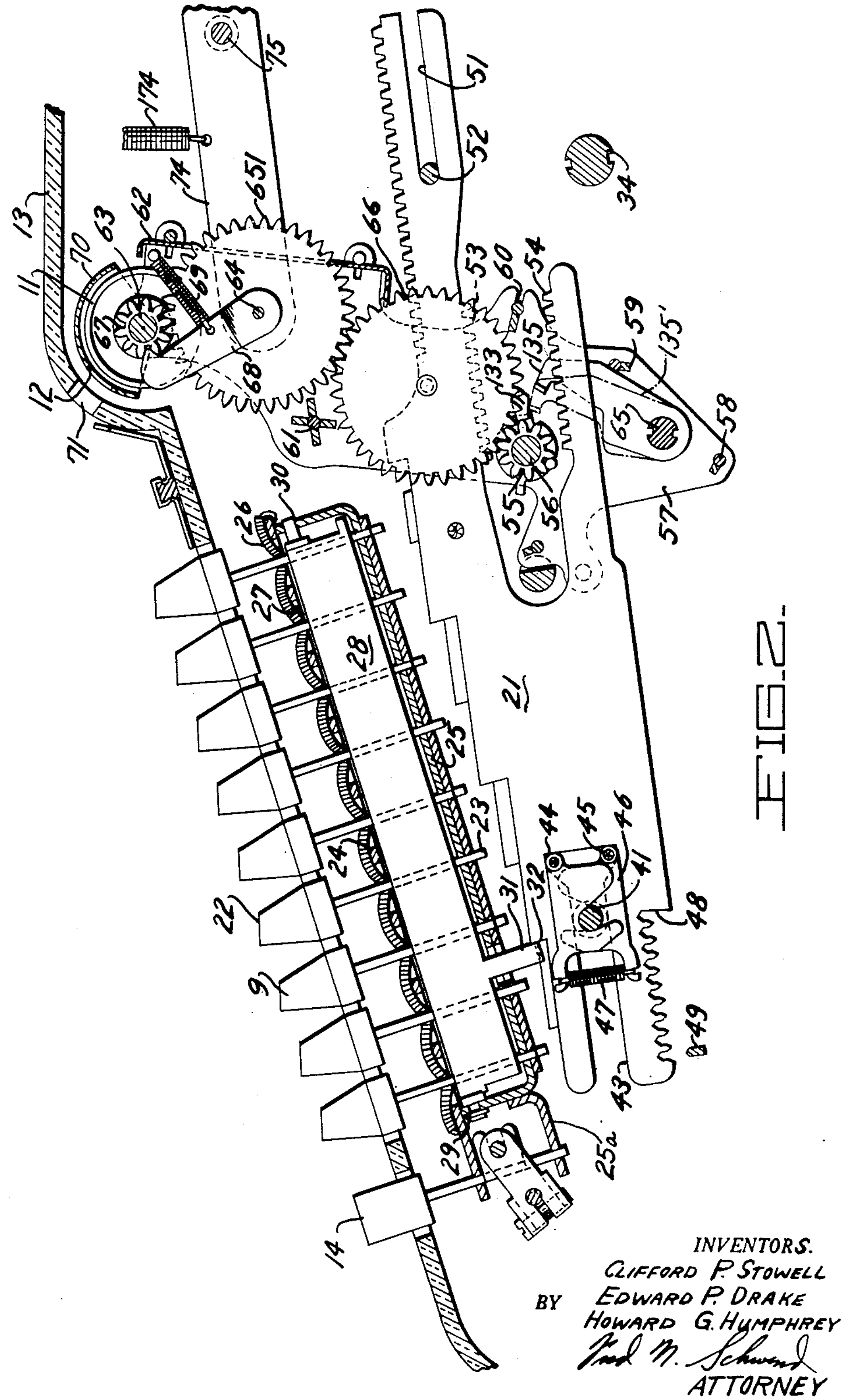
Fig. 2 is a longitudinal sectional view, with the parts broken away, of the machine and is taken substantially along line 2—2 of Fig. 1.

Means are provided for yieldably transmitting a drive from the main shaft 34 to the various drive racks 21 located in the different denominational orders of the machine whereby to yieldably advance said racks to the left in Fig. 2 until arrested by depressed key stems or accumulator elements when the latter reach zero position during clearing operations. Such means include a shaft 41 which is guided for lateral movement fore and aft of the machine in slide bearings (not shown) provided in the frame work of the machine.

Means (not shown) are provided which is operable by the shaft 34 to reciprocate the shaft 41 fore and aft once during each cycle of the machine.

Referring to Fig. 2, each of the drive racks 21 has an elongated slot 43 therein slidably embracing the shaft 41 whereby to support the forward ends of the racks. The slot 43 terminates in opposed lateral depressions 44 at its closed end and each of these depressions is normally engaged by a roller 45 carried by a drive element 46 which is rockably fitted in a groove in the shaft 41. The two drive elements associated with any one rack 21 are spring urged in opposite directions about the shaft 41 by a tension spring 47, thus forming a yieldable connection between the shaft 41 and the various drive racks 21.

When, during the forward movement of the shaft 41, a particular rack 21 is stopped due to striking a depressed key stem 23, the rollers 45 will ride out of the depressions 44, thus breaking the connection between the shaft and the rack.

As shown in Fig. 2, each rack 21 is provided with equally spaced shoulders 32, the spacings of which are slightly larger than the spacings between the key stems 23 so that the rack when advanced toward the front of the machine will strike the lower end of the depressed key stem after it is moved the number of increments equal to the value of the depressed key. In the event a "9" key has been depressed, the rack will not be stopped thereby but will continue forwardly until a shoulder 48 strikes a "9" stop 49.

Each rack, in addition to being guided by the shaft 41, is provided with an elongated slot 51 at the rear end thereof which is guided over a stationary cross rod 52.

Each rack has formed thereon opposed rack gear sections 53 and 54 disposed on opposite sides of an associated accumulator element or gear 55 rotatably mounted on an accumulator shaft 56 forming a part of the accumulator unit.

Since the accumulator unit does not in itself form part of the present invention the details thereof are omitted herein. However, reference may be had to said Drake Patent 2,472,696 for a complete understanding of the accumulator.

*Accumulator controls*

The accumulator unit is arranged to be raised or lowered for the purpose of engaging the various accumulator gears 55 with either of the rack gear sections 53 or 54 of the racks 21.

As previously noted the accumulator is continuously entrained with the dials 11 whereby the total appearing in the accumulator is visibly indicated at all times. For this purpose, the accumulator unit includes brace plates 57 located in the denominational orders and having bearing holes fitted over the shaft 56 and over a second shaft 65 also forming part of the accumulator unit.

The brace plates 57 are held in rigid spaced relation from each other by various combing elements 58, 59, 60 and 61 and also by a transversely extending brace 62.

A shaft 63 is supported by the brace plates 57 on which are rotatably mounted the dials 11. The latter have gears 67 integral therewith which are permanently entrained with the associated accumulator gears 55 through sets of idler gears 66 and 651. The gears 651 are rotatably mounted on a shaft 64 supported by the brace plates 57, the shaft also pivotally supporting individual centralizers or detents 68 which are held in engagement with the gears 67 by springs 69.

The dial numerals are viewed through openings 12 in an arcuate cover piece 70 which are suitably attached to the end ones of the group of brace plates 57, the openings 12 being normally in line with a transversely extending slit 71 in the machine cover 13.

For the purpose of guiding the entire accumulator and dial assembly in its vertical movement between neutral, additive and subtractive settings, the ends of the lower shaft 65 are guided in vertical slots, one of which is shown at 72 (Fig 4) formed in machine side frame plates, fragmentarily indicated at 73. The shaft 64 is pivotally connected to arms 74 pivoted on a stationary shaft 75 to guide the upper portion of the accumulator and dial assembly in a generally vertical direction and tension springs 174 are connected to the latter arms to counterbalance the weight of the assembly.

As previously stated, the accumulator is raised or lowered to mesh the accumulator gears 55 with either the upper rack sections 53 or the lower rack sections 54 of the various racks 21 depending upon the type of operation to be performed. For this purpose mechanism is provided which is under control of the different control bars for determining and effecting the positioning of the accumulator.

The accumulator shaft 56 is provided at each end thereof with a roller, one of which is indicated at 76 (Fig. 4), the latter being engaged in a cam groove 77 formed in a box cam 78 which is pivotally mounted on a frame pin 79. A similar cam (not shown) is provided on raising and lowering the opposite end of the shaft 56 and is operatively connected to the box cam 78 to operate in unison therewith through arms, one of which is indicated at 80, connected through pin-and-slot connections to the two cams and mounted to rock together on a shaft 81 which is suitably pivoted in bearings carried by the machine framework.

Clockwise rocking movement of the cam 78 will raise the accumulator gears 55 into mesh with the rack gear sections 53 to effect additive entries while counter-clockwise rocking of the cam will lower the accumulator gears to effect subtractive entries.

The cam 78 carries a pair of pins 82 and 83 arranged on diametrically opposite sides of the pivot stud 79. These pins are adapted to be selectively engaged by a hook member 84, the latter being connected to a three-armed cam follower 85 pivoted on the shaft 52. The cam follower is urged counter-clockwise by a tension spring 86 to press a roller 87 thereon against a cam 88 keyed on the drive shaft 34. The cam 88 has a high portion extending over half of its periphery whereby to rock the cam follower, and consequently the cam 78, clockwise or counter-clockwise, depending upon the setting of the hook member 84, during approximately the first half of the machine cycle.

Whenever the cam follower engages the low portion of the cam 88, the box cam 78 will be held in a neutral position, to likewise maintain the accumulator gears in a neutral position, by means by a centralizer 89 pivoted at 90 and rocked clockwise by tension spring 91 to hold a roller 92 thereof in a centralizing notch formed in the periphery of the lower edge of the box cam.

Normally, during additive operations or when the machine is at rest the hook member 84 is held in a raised position by tension spring 93 so that a slot 94 therein embraces the upper pin 82. Thus, when the hook member is moved rearward by the cam 88 it will rock the box cam 78 clockwise to raise the accumulator into its additive position.

A slot 95 is also formed in the hook member 84 and when the latter is lowered, as will appear presently, the slot 95 will embrace the pin 83. Therefore, as the hook member is pulled rearwardly, it will rock cam 78 counter-clockwise to lower the accumulator to its subtractive or clearing position. A control bar 96 is provided for lowering the hook member 84, the bar being supported for longitudinal movement by a pair of links 97 and 98 pivotally supported by frame pins 99. The bar 96 has a pair of camming surfaces 100 and 101 formed thereon, the former underlying the pin 102 mounted on a bell crank 103 (see Fig. 3) pivoted at 104. The pin 102 also underlies one of the stems of the subtract bar 16. Thus, depression of the minus bar will depress the pin 102 against the action of a tension spring 105 connected to the bell crank 103, to cam the control bar 96 rearward. The latter is connected through a pin-and-slot arrangement 106 to a bell crank 107 fulcrumed at 108 and connected through a second pin-and-slot arrangement 109 to the hook member 84 whereby forward movement of the bar 96 will be effective to lower the hook member 84 into its subtract controlling position.

The camming surface 101 of the bar 96 underlies a pin 110 carried by a lever 111 fulcrumed at 112, the pin 110 underlying a stem of the clear bar 18. A tension spring 113 normally holds the pin 110, and consequently the clear bar, in their illustrated raised positions. However, upon depression of the clear bar the pin 110 will cam the control bar 96 rearwardly in the same manner as will the pin 102.

*Clutch controls*

Operation of the machine and engagement of the clutch 36 (Figs. 3 and 8) is effected by depressing any of the motor operation control bars 14, 15, 16, 17 or 18. For this purpose, the aforementioned clutch control dog 37 is normally connected to a hook 114 pivotally connected at 115 to a clutch control bar 116, the latter having slots 117 guided over frame pins 118 to permit longitudinal movement of the bar.

The clutch control bar 116 is actuated directly by the hereinbefore mentioned pin 110 upon depression of the clear bar 18 to effect engagement of the clutch 36. For this purpose, the pin 110 overlies an inclined camming slot 120 in the bar 116 and is effective upon depression of the clear bar to cam the bar 116 forwardly against the combined action of the clutch dog spring 39 and a second spring 39*a* which is normally effective to hold the hook 114 in connection with the clutch dog 37.

However, to reduce finger pressure on the control bars 14 to 17, inclusive, to a minimum, electromagnetic means are provided which are rendered effective by switches closed upon depression of said latter bars to effect clutch engagement. As disclosed in detail in said Boyden application, S. N. 582,553, means are provided (not shown herein) whereupon depression of either of the bars 15 or 17 will rock a pivotal shaft 122 clockwise. The latter bar has an arm 121 secured thereto and provided with a pin 123 embraced by a slot formed in the stem of the front add 14 whereupon depression of the latter will likewise rock the shaft 122 clockwise. The shaft 122 carries a second arm 124 which, upon rocking of the shaft by any of the keys 14, 15, and 17, will actuate and close a normally open switch 125. The latter (see also Fig. 8) is connected in circuit with a solenoid 126 and with a power supply line 127. The plunger of solenoid 126 is connected to a lever 128 pivoted at 129 and coupled to a slide 130. The latter is guided for longitudinal movement by frame pins 130*a* extending through elongated guide slots formed in the slide. The latter slide abuts the rear end of the clutch control bar 116. Thus, actuation of the solenoid 126 is effective through the elements 128 and 130 to actuate the bar 116 to cause engagement of the clutch 36.

Actuation of the solenoid 126 upon depression of the minus bar 16 is effected through a second switch 125*a* provided in parallel circuit relation to the switch 125 and mounted below a projection 131 on the minus bar operated bell crank 103. Thus, depression of the minus bar will engage pin 102 to rock the bell crank 103 clockwise, causing the extension 131 to actuate and close the switch 125*a*.

If desired, additive entries into the machine may be made by a foot operated switch 132 also connected in parallel circuit relation to the switches 125 and 125*a*.

*Clearing controls*

As mentioned hereinbefore, depression of the clear bar 18 is effective to return all of the accumulator gears 55 to zero positions.

Each of the accumulator gears has fixed thereon a zero positioning ear 133. During clearing operations, the accumulator unit is lowered whereby the accumulator gears 55 are meshed with the rack sections 54 of the drive racks 21. The racks are then yieldably driven forward to rotate the gears in a clockwise direction until the ears 133 engage zero stop arms 135 which are, during a clearing operation, rocked from their normal full line positions into their dotted line positions 135′, into the path of the ears 133. For this purpose, the various arms 135 are keyed on the shaft 65 to which is also keyed an arm 136 (Fig. 4). The latter is connected through a pin-and-slot connection 137 to an actuating lever 138. The latter is supported at the forward end thereof by a link 139 connected, in turn, through a pin-and-slot connection 140 at the upper end thereof to a mid point on a cross link 141. This link is connected at its forward end to the aforementioned pin 110 and at the rear end thereof to a pin 142 underlying the rear stem of the clear bar 18.

The lever 138 overlies and rests on the pin 90, and upon depression of the clear bar 18 the lever is rocked about the pin 90 as a fulcrum by the links 139 and 141 to position a shoulder 143 directly in front of a pin 144 carried by the cam follower 85. As the latter is rocked by the cam 88, as an incident to a clear operation, the lever 138 is moved forwardly by pin 144, rocking the arm 136 and the shaft 65 to position the zero stop arms 135 in blocking relation to the accumulator gears. Since this action of the arms 135 occurs at the beginning of a clear operation or cycle the arms will be set in blocking position before and during the forward drive of the racks 21.

*Multiplication-division counter*

The multiplication-division counter comprises a counter dial 146 (Figs. 1, 3, 7, 9 and 10) rotatably mounted on a frame pin 147 and urged in a clockwise direction by a spring 148 tensioned between a frame pin 149 and a cable 150, the latter being wrapped around the periphery of a hub forming part of the dial 146. The dial is provided with 12 numerals on the periphery thereof ranging as indicated in the developed view in Fig. 10.

A ratchet 248 is suitably fastened to the dial 146 and is provided with 12 teeth corresponding to the 12 numerical positions of the dial. The teeth of the ratchet are adapted to be engaged by the holding pawl 249 pivoted on a frame pin 250 and urged into pawling engagement with the ratchet by spring 151. It will be noted that the teeth of the ratchet are of the same size except for a large tooth 152 which is engaged by the pawl 249 when the dial 146 is in its home position illustrated in Fig. 3.

Means are provided for advancing the counter dial 146 one increment as an incident to each cycle of operation of the machine and for this purpose a second ratchet 153 is also suitably secured to the dial 146. The latter is also provided with 12 teeth which are adapted to be engaged by an actuating pawl 154 pivotally connected at 155 to the upper end of the cam follower 85. The forward end of the pawl 154 is supported through a pin-and-slot connection by a link 156 which in turn is connected to a lever 157. Lever 157 is pivotally supported at 158 and is connected through a pin-and-slot connection to the upper end of the aforementioned link 141. Normally, in machine operations other than clearing operations initiated by the clear bar 18, the pawl 154 is held in its upper effective position illustrated through the linkage 156, 157, etc., to engage the ratchet 153 and advance dial 146 one increment during each machine cycle, the dial being retained in its advanced positions by the holding pawl 249. Thus, the counter dial starting from a zero registration, will indicate the total number of cycles ensuing during repeated cycling of the machine while one of the control bars is held depressed.

Means are provided, however, to cause the counter dial to return to zero registration during the first cycle following the depression of a new control bar or following redepression of the same control bar. For this purpose, a bypass pawl 160 (Figs. 3 and 9) is pivoted to the lower end of the holding pawl 249 and a spring 161 is connected between these pawls to normally hold pawl 160 in engagement with a shoulder 162 provided on the holding pawl 249. Upon counterclockwise rocking of the clutch dog 37 to initiate a machine cycle or cycles, the stud 163 on the latter will engage a camming surface on the lower end of the bypass pawl 160, camming the two pawls upwardly as a unit about the pivot 250 to release the ratchet 248 permitting the spring 148 to rotate the dial 146 toward its zero position. Although the pawl 249, in being rocked clockwise to release the ratchet 248, will clear the tops of the small teeth of the ratchet, it will not clear the top of the large tooth 152, as evidenced by the showing in Fig. 9, whereupon the dial will be arrested in its zero position. At this time, the actuating pawl 154 will be located in a forward position as illustrated and will thus not interfere with return rotation of the dial. The stud 163 on the clutch dog moves to a position underlying the bottom surface of the pawl 160 during retraction of the clutch dog 37 and thus momentarily holds the holding pawl 249 beyond the tips of the smaller teeth in the ratchet 248 to insure complete return of the dial 146 to its zero registration. Shortly thereafter, the pawl 154 is advanced under power to advance the dial to its 1st (1) registration and during this movement an extension 165 on the pawl engages and rocks the bypass pawl 160 counterclockwise relative to the holding pawl 249 until the bypass pawl drops off the stud 163, permitting the holding pawl to drop into position behind the first small tooth of the ratchet 248, thereby locating the dial in its "1" position. If the control bar were held depressed through two successive cycles the actuating pawl 154 would be reciprocated twice, leaving the dial at a "2" registration.

*Counter controls*

Figures 5, 6, 7, 8:
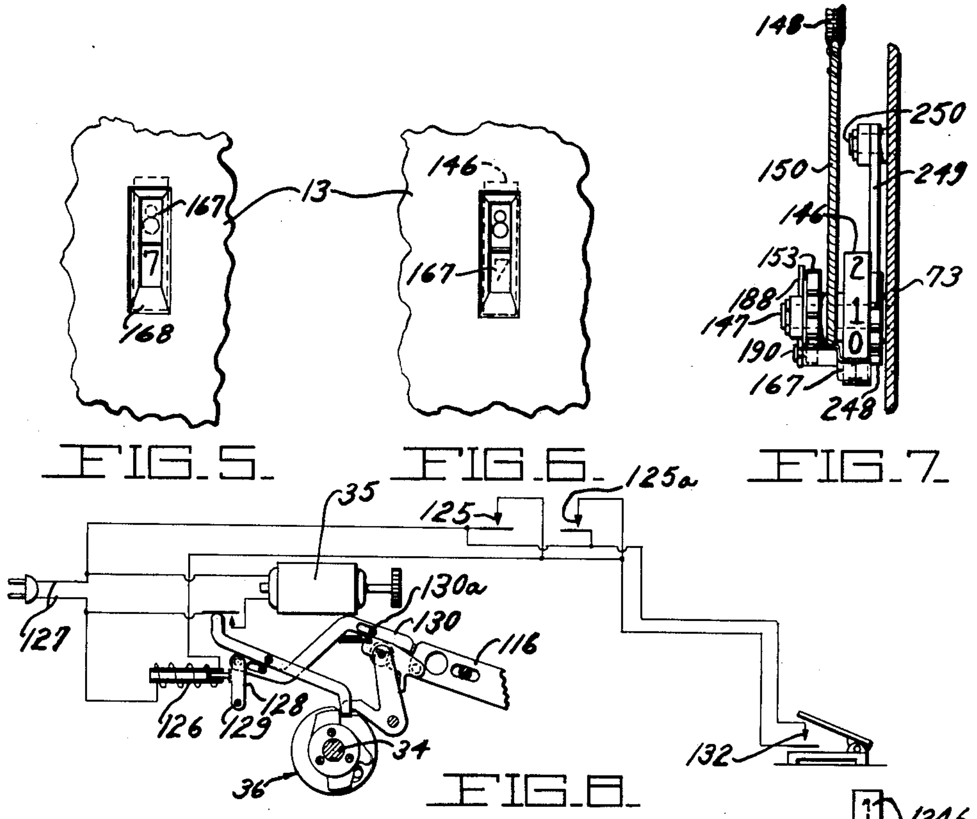
Figs. 5 and 6 are fragmentary plan views illustrating the multiplication-division counter with the shutter therefor in alternate positions.
Fig. 7 is a sectional plan view of the multiplication-division counter and is taken substantially along the line 7—7 of Fig. 3.
Fig. 8 is a wiring diagram of the controls for the machine.

A shutter 167 is provided to block from view one or the other of two of the digits of the dial 146 which would otherwise be visible in a window 168 provided in the machine cover 13. Normally, whenever the machine is not in a negative over-drafted condition, the shutter is positioned as shown in Figs. 1 and 6 and in the full lines of Fig. 3. In this condition, the dial indicates a true count of the number of cycles taken by the machine during a continual depression of a control bar regardless of whether addition or subtraction cycles have been made.

Thus, in performing multiplication operations, the operator need merely set the multiplicand in the keyboard and hold the repeat bar depressed until the dial registers the value of the current multiplier digit. Thereafter, he re-enters the multiplicand in the keyboard in proper denominational relation to the previous multiplicand setting and again holds the repeat bar depressed until the value of the next digit of the multiplier is registered on the dial 146, and so on. During division, as was stated hereinbefore, the divisor is subtracted from the dividend until a negative overdraft occurs. Therefore, the total number of cycles encountered is one greater than the value of the quotient digit and, at this time, the shutter 167 is automatically rocked into its alternate position shown in Fig. 6 and at 167a in Fig. 3 to indicate the true value of the quotient digit being obtained.

Describing now the means for automatically setting the shutter in either of its alternate positions, reference is made particularly to Fig. 3 and to the copending application of Boyden et al., Serial No. 151,896, filed March 26, 1950, which discloses similar controls responsive to an overdraft occurrence of the accumulator.

As is a generally inherent characteristic of accumulators, when an amount being subtracted becomes greater than that registered by the accumulator, a negative overdraft will occur and the accumulator gears in orders to the left of those being digitized will turn from 9 to zero registration, due to the borrowing action of the tens transfer mechanism.

As shown in Fig. 3, the highermost order accumulator gear 155a is provided with a special tooth 175 which, when the gear is located in zero registration as illustrated, extends between the tails of a pair of opposed bypass pawls 176 and 177, pivotally mounted at 178 and 179, respectively, on a rocking plate 180 which is pivotally mounted on the aforementioned shaft 65. A tension spring 181, extending between the pawls, maintains the pawls in their illustrated positions engaging the shaft 65.

The plate 180 is settable by the accumulator gear tooth 175 into either its position shown or into another position counter-clockwise of its illustrated position and is held in either position by a centralizer 182 pivotally supported at 183 on an extension of the leftmost accumulator brace plate 57a. A spring 184 extending between the centralizer and a suitable portion of the accumulator frame maintains a pin on the centralizer 182 in engagement with one or the other of two detenting notches 185 formed in the plate 180.

The plate 180 is connected through a link 186 to a lever 187 pivoted on the pin 38, the lever, in turn, being connected by a link 188 to shutter 167. The shutter is pivotally mounted on the frame pin 147 and is pivotally connected at 190 to the link 188.

When a negative overdraft occurs due to oversubtraction, the accumulator gears including the highermost order gear 155a, will turn clockwise from zero into nine registration and the ear 175 of gear 155a will actuate pawl 177 to thereby rock the plate 180 counter-clockwise about shaft 65 into a position wherein the detenting pin of centralizer 182 will engage the upper detenting notch 185 in the plate. This will actuate the linkage 186, 187 and 188 to rock the shutter 167 into its upper dot-dash line position 167*a*, thereby indicating a numeral on the dial 146 representing one less than the true count of the total number of cycles occurring during the instant subtraction operation. Thus, a true quotient digit will be indicated.

Means are provided for automatically arresting operation of the machine during subtraction and upon reaching a negative overdrafted condition. For this purpose, the lever 187 is connected through a link 192 to a lever 193 pivoted at 194.

The latter is provided with a camming stud 195 engageable with a camming extension 196 on the aforementioned hook 114. Normally, when the accumulator is in positive condition (i. e., with the parts in their positions illustrated in Fig. 3) the hook 114 will not engage the stud 195 during forward movement of the clutch control bar 116 and clutch control dog 37 to their clutch engaging positions. However, when the latter parts are held in clutch-engaging position incident to holding down the minus bar 16 and a negative overdraft occurs, causing the gear 155*a* to rock the plate 180 counter-clockwise, the lever 193 will be rocked clockwise, moving the stud 195 from its full line position to its dotted line position 195*a*. During this movement, the stud will engage and cam the hook 114 to release the clutch dog 37, enabling the spring 39 to return the same to clutch engaging position even though the minus bar is held depressed. When the minus bar is released to rise, the hook 114 will again reengage the stud 163 of the clutch dog.

When a negative overdraft condition is corrected as by clearing the accumulator or by adding into the accumulator an amount greater than the deficit occurring therein, all of the accumulator gears or those gears to the left of the orders being digitized, will be advanced from nine to zero registration and the tooth 175 of the highermost order accumulator gear 155*a* will therefore move counter-clockwise back to its full line position shown in Fig. 3, picking up the pawl 176 to return the plate 180 and parts connected thereto back to their illustrated full line positions of Fig. 3. This action will cause the stud 195 to traverse its path in the reverse direction and against release the hook 114 to arrest the machine. Also, the shutter 167 will be returned from its overdraft position of Fig. 5 to its normal position of Fig. 6.

If a relatively large amount is entered into the accumulator, in which case the highermost order accumulator gear 155*a* is advanced through one or more revolutions in an additive (counter-clockwise) direction the tooth 175 will merely wipe over the pawl 177 without altering the position of the plate 180 and will completely miss the pawl 176. The same will be true when subtracting relatively large amounts from the accumulator after the same assumes a negative condition, in which case the tooth 175 will merely wipe over the pawl 176 in a clockwise direction and will miss the pawl 177 without altering the position of the plate 180 from its negative overdrafted position.

Figure 10:
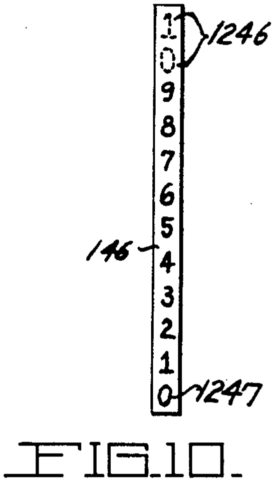

As mentioned hereinbefore and as shown particularly in the developed view of Fig. 10, the dial 146 is provided with twelve numerals. The lower ten numerals in Fig. 10, ranging from zero to nine, are printed in black whereas the upper two numerals indicating "0" and "1" are printed in a distinctive color, i. e., red. Normally, following a clear operation, the dial 146 presents the black "0" 1247 to view. During normal operations of the machine; that is, during continuous cycling of the machine through any number of cycles up to nine only the black numerals would be visible. However, upon continuous cycling of the machine beyond nine cycles, which would normally be considered an abnormal operation, a red numeral "0" or "1" would appear.

It will be noted in Fig. 9 that the tooth on ratchet 153 which would otherwise enable advancement of the dial from the red "1" to the black "0" is missing. Therefore, the pawl 154 is incapable of advancing the dial beyond its red "1" or twelfth numerical registration position even though one or another of the control bars is held depressed to cause a greater number of machine cycles to ensue.

It will also be noted that the position of the missing tooth of ratchet 153 is normally directly opposite the actuating pawl 154 when the dial is in zero or initial position. Thus, since in a clearing operation the dial is first returned to zero position in the usual manner, ample clearance is retained between the actuating pawl and the ratchet 153, remembering that the pawl 154 is held in a lowered position during clearing operations.

Although we have described a preferred embodiment of our invention in detail and have therefore used certain terms and languages herein, it is to be understood that the present disclosure is illustrative rather than restrictive and that changes and modifications may be made without departing from the spirit or scope of the invention as set forth in the appended claims.

Having thus described the invention, what we desire to secure by United States Letters Patent is:

1. In a calculating machine having cyclically operable mechanism and drive means therefor; the combination comprising means for controlling operation of said mechanism including a depressible key, said controlling means being effective upon release of said key to arrest said mechanism, a cycle counting device, means operable in time with said mechanism for advancing said counting device one step for each cycle of operation of said mechanism, means for returning said device to an initial position from any advanced position thereof, mechanism controlled by said key upon a predetermined depression thereof for causing operation of said last mentioned means, and mechanism controlled by said key upon further depression thereof for initiating operation of said first mentioned mechanism.

2. In a calculating machine having cyclically operable mechanism and drive means therefor; the combination comprising means for controlling operation of said mechanism including a depressible key effective upon depression thereof to cause single cyclic or continued multi-cyclic operation of said mechanism, said controlling means being effective upon release of said key to arrest said mechanism, a cycle counting device, means operable in time with said mechanism for advancing said counting device from an initial position, said last named means being operable to advance said counting device one increment during each succeeding cycle of said mechanism, a device for retaining said counting device in advanced position, spring means for returning said counting device to said initial position from any advanced position, means responsive to depression of said key for rendering said retaining means ineffective, and means operable by said advancing means to render said retaining means effective.

3. In a calculating machine having cyclically operable mechanism and drive means therefor; the combination comprising means for controlling operation of said mechanism including a plurality of depressible keys, each of said keys being effective upon depression thereof to cause operation of said mechanism, said controlling means being effective upon release of any of said keys to arrest said mechanism, a counting device, means operable in time with said mechanism for advancing said counting device as an incident to each cycle of operation of said mechanism, means responsive to depression of one of said keys for disabling said advancing means, and means responsive to depression of any of said keys for returning said counting device to an initial position.

4. In a calculating machine having cyclically operable mechanism and drive means therefor, the combination comprising means for controlling operation of said mechanism including a depressible key effective upon depression thereof to cause operation of said mechanism by said drive means, said controlling means being effective upon release of said key to arrest said mechanism, a counting device, spring means for moving said device to an initial position from an advanced position thereof, means normally operable during each cycle of operation of said mechanism for advancing said counting device from said initial position, a pawl for retaining said counting device in any of a plurality of positions to which the same has been advanced, means controlled by said key upon depression thereof for releasing said pawl, a latch for holding said pawl in released condition, and means controlled by said mechanism for releasing said latch and for thereafter operating said advancing means.

5. In a calculating machine having cyclically operable mechanism and drive means therefor; the combination comprising means for controlling operation of said mechanism including a plurality of depressible keys, each of said keys being effective upon depression thereof to cause operation of said mechanism, said controlling mechanism being effective upon release of a depressed one of said keys to arrest said mechanism, a counting device, spring means for moving said counting device to an initial position, means normally operable during each cycle of operation of said machine for advancing said counting device from said initial position, means normally retaining said counting device in a position to which it is advanced, means responsive to the depression of one of said keys for disabling said advancing means, and means controlled by any of said keys upon depression thereof for releasing said retaining means.

6. In a calculating machine having cyclically operable mechanism and drive means therefor; the combination comprising means for controlling operation of said mechanism including a plurality of depressible keys, each of said keys being effective upon depression thereof to cause operation of said mechanism, said controlling means being effective upon release of any of said keys for arresting said mechanism, a cycle counting device including a toothed element; means including a toothed drive member for operating said toothed element, means operable by said drive means in time with said mechanism for normally engaging said toothed element to advance said counting device one step as an incident to each cycle of operation of said mechanism, means responsive to depression of any of said keys for returning said counting device to an initial position, and means responsive to depression of one of said keys for maintaining said toothed member out of cooperative relation with said toothed element.

7. In a calculating machine having a cyclically operable mechanism and drive means therefor; the combination comprising means for controlling operation of said mechanism by said drive means including a depressible key effective upon depression thereof to cause said drive means to drive said mechanism through one or more cycles; said means being effective upon release of said key to arrest said mechanism, a cycle counting device including a dial, a toothed element operatively connected to said dial, said element having a plurality of teeth and a stop thereon, means including a toothed member operable in time with said mechanism for normally engaging the teeth of said element to advance the dial as an incident to each cycle of operation of said mechanism, a pawl for retaining said element and said dial in advanced position, spring means for returning said element and said dial to an initial position, and means responsive to said key upon depression thereof for moving said pawl from engagement with the teeth of said element to a position in the path of said stop.

8. In a calculating machine; the combination of a registering mechanism, cyclically operable actuating mechanism therefor, means for selectively causing said actuating mechanism to drive said registering mechanism in additive or subtractive directions during entry of amounts, a unidirectional counting and indicating device for invariably counting the actual number of cycles of operation of said actuating mechanism during entry of amounts, and a device controlled by said registering mechanism upon an overdraft thereof for causing said counting device to indicate one less than the actual number of cycles of operation of said actuating mechanism.

9. In a cyclically operable calculating machine, the combination of a register, cyclically operable actuating mechanism therefor, means for selectively causing said actuating mechanism to drive said register in additive or subtractive directions during entry of amounts, a device including a dial having a row of indicia therearound of progressively increasing values for counting the cycles of operation of said actuating mechanism and means for invariably advancing said dial in a direction to exhibit indicia of progressively increasing values during successive entries of said amounts; a shutter settable in either of two positions to uncover one or the other of two of said indicia, and means responsive to said register upon an overdraft thereof for moving said shutter from one of said positions to another.

10. In a cyclically operable calculating machine; the combination of a register, cyclically operable actuating mechanism therefor, means for selectively causing said actuating mechanism to drive said register in additive or subtractive directions during entry of amounts, a device including a dial having a row of indicia therearound of progressively increasing values for counting the cycles of operation of said actuating mechanism and means for invariably advancing said dial in a direction to exhibit indicia of progressively increasing values during successive entries of said amounts; a cover having an opening therein located over two adjacent ones of said indicia, a shutter settable in either of two positions to uncover one or the other of two adjacent ones of said indicia, and means controlled by said register upon an overdraft thereof for moving said shutter from one of said positions to another.

11. In a calculating machine; the combination comprising a registering mechanism, cyclically operable actuating mechanism therefor, means for controlling operation of said actuating mechanism including a depressible key effective upon depression thereof to cause said actuating mechanism to drive said registering mechanism through one or more cycles, a device for counting the number of cycles of operation of said actuating mechanism, a pawling device for retaining said counting device in advanced position, spring means for returning said counting device to an initial position, means responsive to said key upon depression thereof for rendering said pawling device ineffective, means for maintaining said pawling device ineffective, and means responsive to said actuating mechanism upon operation thereof for rendering said last mentioned means ineffective.

12. In a calculating machine; the combination comprising a register, cyclically operable actuating mechanism therefor, means for controlling said actuating mechanism including a depressible key effective upon depression thereof to cause said actuating mechanism to drive said register through one or more cycles, a counting dial, means operable in time with said actuating mechanism for advancing said dial one increment as an incident to each cycle of operation of said actuating mechanism, a pawl for returning said dial in advanced position, spring means for returning said dial to an initial position, means operable by said key upon depression thereof for releasing said pawl, said last named means being effective to thereafter retain said pawl in released condition, and means operable as an incident to operation of said actuating mechanism for rendering said last named means ineffective.

13. In a calculating machine, the combination comprising registering mechanism, cyclically operable actuating mechanism therefor, means including a depressible key for initiating and controlling operation of said actuating mechanism, a cycle counting device, means operable in time with said actuating mechanism for advancing said counting device one step for each cycle of operation of said actuating mechanism, means including a second depressible key for clearing said registering mechanism, means responsive to depression of either of said keys for clearing said cycle counting device, and means responsive to depression of said second depressible key only for rendering said advancing means ineffective.

14. In a calculating machine; the combination comprising registering mechanism, actuating mechanism therefor, cyclically operable drive means for said actuating mechanism, means including a depressible key for initiating and controlling operation of said actuating mechanism by said drive means, a cycle counting device, means operable by said drive means in time with said actuating mechanism for advancing said counting device one step for each cycle of operation of said actuating mechanism, means including a second depressible key for causing said drive means to clear said registering mechanism, means controlled by each of said keys for clearing said counting device, and means controlled by said second depressible key only for rendering said advancing means ineffective.

15. In a calculating machine having cyclically operable mechanism and drive means therefor including a clutch; the combination comprising means for controlling operation of said mechanism including a depressible key, control mechanism operable by said key upon depression thereof for causing engagement of said clutch, said control mechanism being effective upon release of said key to cause disengagement of said clutch, a cycle counting device, means operable in time with said cyclically operable mechanism for advancing said counting device one step for each cycle of operation of said cyclically operable mechanism, spring means for returning said counting device to an initial position, a detent for retaining said counting device in advanced position, mechanism operable by said key upon depression thereof a predetermined amount for releasing said detent, and mechanism operable by said key upon further depression thereof for actuating said control mechanism to cause engagement of said clutch.

CLIFFORD P. STOWELL.
EDWARD P. DRAKE.
HOWARD G. HUMPHREY.

References Cited in the file of this patent

UNITED STATES PATENTS

| Number | Name | Date |
|---|---|---|
| 935,565 | Trinks | Sept. 28, 1909 |
| 1,349,049 | Crumpton | Aug. 10, 1920 |
| 1,566,650 | Chase | Dec. 22, 1925 |
| 1,910,738 | Avery | May 23, 1933 |
| 2,136,694 | Laiho | Nov. 15, 1938 |
| 2,255,622 | Landsiedel | Sept. 9, 1941 |
| 2,289,055 | Landsiedel | July 7, 1942 |
| 2,327,981 | Friden | Aug. 31, 1943 |
| 2,403,273 | Friden | July 2, 1946 |
| 2,531,089 | Turck | Nov. 21, 1950 |